(12) United States Patent
Zhang et al.

(10) Patent No.: US 12,425,166 B2
(45) Date of Patent: Sep. 23, 2025

(54) METHOD FOR SIMULTANEOUS RECEPTION OF SSB AND OTHER SIGNALS

(71) Applicant: Apple Inc., Cupertino, CA (US)

(72) Inventors: Yushu Zhang, Beijing (CN); Wei Zeng, Santa Clara, CA (US); Huaning Niu, San Jose, CA (US); Oghenekome Oteri, San Diego, CA (US); Dawei Zhang, Saratoga, CA (US); Weidong Yang, San Diego, CA (US); Haitong Sun, Cupertino, CA (US); Jie Cui, San Jose, CA (US); Qiming Li, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/913,757

(22) PCT Filed: Sep. 24, 2021

(86) PCT No.: PCT/CN2021/120294
§ 371 (c)(1),
(2) Date: Sep. 22, 2022

(87) PCT Pub. No.: WO2023/044746
PCT Pub. Date: Mar. 30, 2023

(65) Prior Publication Data
US 2024/0223336 A1    Jul. 4, 2024

(51) Int. Cl.
*H04L 5/00* (2006.01)
*H04B 7/06* (2006.01)
*H04W 24/10* (2009.01)

(52) U.S. Cl.
CPC ......... *H04L 5/0053* (2013.01); *H04B 7/0626* (2013.01); *H04B 7/06968* (2023.05); *H04W 24/10* (2013.01)

(58) Field of Classification Search
CPC ... H04L 1/1854; H04L 5/0092; H04L 67/303; H04L 5/0053; H04W 16/28;
(Continued)

(56) References Cited

U.S. PATENT DOCUMENTS 10,917,185 B2    2/2021    Yoon et al.
11,375,549 B2    6/2022    Lei et al.
(Continued)

FOREIGN PATENT DOCUMENTS

CN    110392991 A    10/2019
CN    112399492 A    2/2021
(Continued)

OTHER PUBLICATIONS

International Search Report and Written Opinion for International Application No. PCT/CN2021/120294, Chinese National Intellectual Property Administration, China, mailed May 25, 2022, 8 pages.
(Continued)

*Primary Examiner* — Michael Thier
*Assistant Examiner* — Prince A Mensah
(74) *Attorney, Agent, or Firm* — Sterne, Kessler, Goldstein & Fox P.L.L.C.

(57) ABSTRACT

Approaches are described for receiving downlink signals simultaneously where analog beamforming is being used to increase the link budget between the base station and user equipment (UE). Alternatives within these approaches include the UE determining the synchronization signal block (SSB) to receive when there are multiple SSBs from different cells in a slot, and determining whether there are other signals in the same symbols with the selected SSB based on the type of signal and the SSB's functionality. In the case where there are another downlink signals channel state information-reference signal (CSI-RS) or physical downlink shared channel (PDSCH) from another cell, the UE selects
(Continued)

the corresponding quasi co-location (QCL) assumption to receive the signals. Optionally, the UE can report whether it can support one or two QCL-TypeD at a time and whether it supports SSBs in different cells multiplexed in overlapped symbols.

17 Claims, 8 Drawing Sheets

(58) Field of Classification Search
CPC .......... H04W 36/0005; H04W 36/165; H04W 52/0235; H04W 72/0453; H04W 72/232; H04B 7/0491–0888
See application file for complete search history.

(56) References Cited

U.S. PATENT DOCUMENTS

| | | | | |
|---|---|---|---|---|
| 2015/0009972 | A1* | 1/2015 | Xu | H04L 1/1854 370/336 |
| 2019/0182000 | A1* | 6/2019 | Futaki | H04W 36/165 |
| 2020/0092814 | A1* | 3/2020 | Zhou | H04W 52/0235 |
| 2020/0382978 | A1 | 12/2020 | Manolakos et al. | |
| 2021/0045076 | A1 | 2/2021 | Tomeba et al. | |
| 2021/0083730 | A1* | 3/2021 | Hwang | H04L 5/0092 |
| 2021/0092696 | A1 | 3/2021 | Ko et al. | |
| 2021/0153215 | A1* | 5/2021 | Guan | H04L 67/303 |
| 2021/0306895 | A1 | 9/2021 | Chen et al. | |
| 2021/0352714 | A1* | 11/2021 | Gao | H04W 36/0005 |
| 2022/0167222 | A1 | 5/2022 | Zheng et al. | |
| 2023/0007602 | A1* | 1/2023 | Gajula | H04W 16/28 |
| 2023/0053871 | A1* | 2/2023 | Tran | H04B 7/0408 |
| 2023/0164712 | A1* | 5/2023 | Kim | H04L 5/0053 370/350 |
| 2024/0089941 | A1* | 3/2024 | Yamamoto | H04W 72/0453 |
| 2024/0214849 | A1* | 6/2024 | Bergström | H04W 36/0085 |
| 2024/0251424 | A1* | 7/2024 | Lu | H04W 72/232 |

FOREIGN PATENT DOCUMENTS

| | | |
|---|---|---|
| CN | 113330805 A | 8/2021 |
| WO | WO 2020119727 A1 | 6/2020 |
| WO | WO 2021120148 A1 | 6/2021 |

OTHER PUBLICATIONS

3GPP TS 38.133 V15.14.0 (Jun. 2021), 3rd Generation Partnership Project; Technical Specification Group Radio Access Network; NR; Requirements for support of radio resource management (Release 15); 1225 pages.

3GPP TS 38.214 V15.13.0 (Jun. 2021), 3rd Generation Partnership Project; Technical Specification Group Radio Access Network; NR; Physical layer procedures for data (Release 15); 106 pages.

Extended European Search Report directed to related European Application No. 21957879.6, mailed Mar. 24, 2025; 10 pages.

Office Action directed to Chinese Application No. 202180007208.4, with machine translation attached, mailed May 31, 2025; 16 pages.

Apple Inc., "On Multi-TRP Beam Management Enhancement," 3GPP TSG-RAN WG1 Meeting #103-e, e-Meeting, Jan. 25-Feb. 5, 2021, R1-2101353; 7 pages.

Apple Inc., "On Multi-TRP Beam Management Enhancement," 3GPP TSG-RAN WG1 Meeting #106-e, e-Meeting, Aug. 16-27, 2021, R1-2107721; 7 pages.

* cited by examiner

METHOD FOR SIMULTANEOUS RECEPTION OF SSB AND OTHER SIGNALS

BACKGROUND

Field

Various aspects generally may relate to the field of wireless communications.

SUMMARY

Aspects of the approach described herein include a user equipment (UE). The UE includes a radio frequency (RF) receiver, and configured to simultaneously receive, via an antenna, a first downlink signal and a second downlink signal from a first base station and a second base station respectively. The first base station and the second base station have a first type and a second type respectively, the type being a serving cell, an assistant cell, or a candidate cell. The UE further includes processing circuitry coupled to the RF receiver, where the processing circuitry configured to measure, based on a rule, the first downlink signal to support communication with the first base station, wherein the first downlink signal includes a first synchronization signal block (SSB) signal.

Aspects of the approach also include a method that includes the step of simultaneously receiving, by a user equipment (UE), a first downlink signal and a second downlink signal from a first base station and a second base station respectively, wherein the first base station and the second base station have a first type and a second type respectively, the type being a serving cell, an assistant cell, or a candidate cell. The method further includes the step of measuring, based on a rule, the first downlink signal to support communication with the first base station, wherein the first downlink signal includes a first synchronization signal block (SSB) signal.

Aspects of the approach described herein include a base station. The base station includes processing circuitry configured to encode a downlink signal, wherein the downlink signal includes a first synchronization signal block (SSB) signal and a measurement window information, the measurement window information being received from high layer signaling. The base station further includes a radio frequency (RF) transmitter, coupled to the processor circuitry, the RF transmitter configured to transmit the downlink signal to a user equipment (UE), wherein the measurement window information indicates to the UE when to measure the SSB signal, and the base station is either a serving cell or an assistant cell.

Aspects of the approach also include a method that includes the step of receiving, at a base station, measurement window information via higher layer signaling. The method further includes the step of encoding a downlink signal, wherein the downlink signal includes a first synchronization signal block (SSB) signal and the measurement window information. The method further includes the step of transmitting the downlink signal to a user equipment (UE), wherein the measurement window information indicates to the UE when to measure the SSB signal, and the base station is either a serving cell or an assistant cell.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Figure 1:
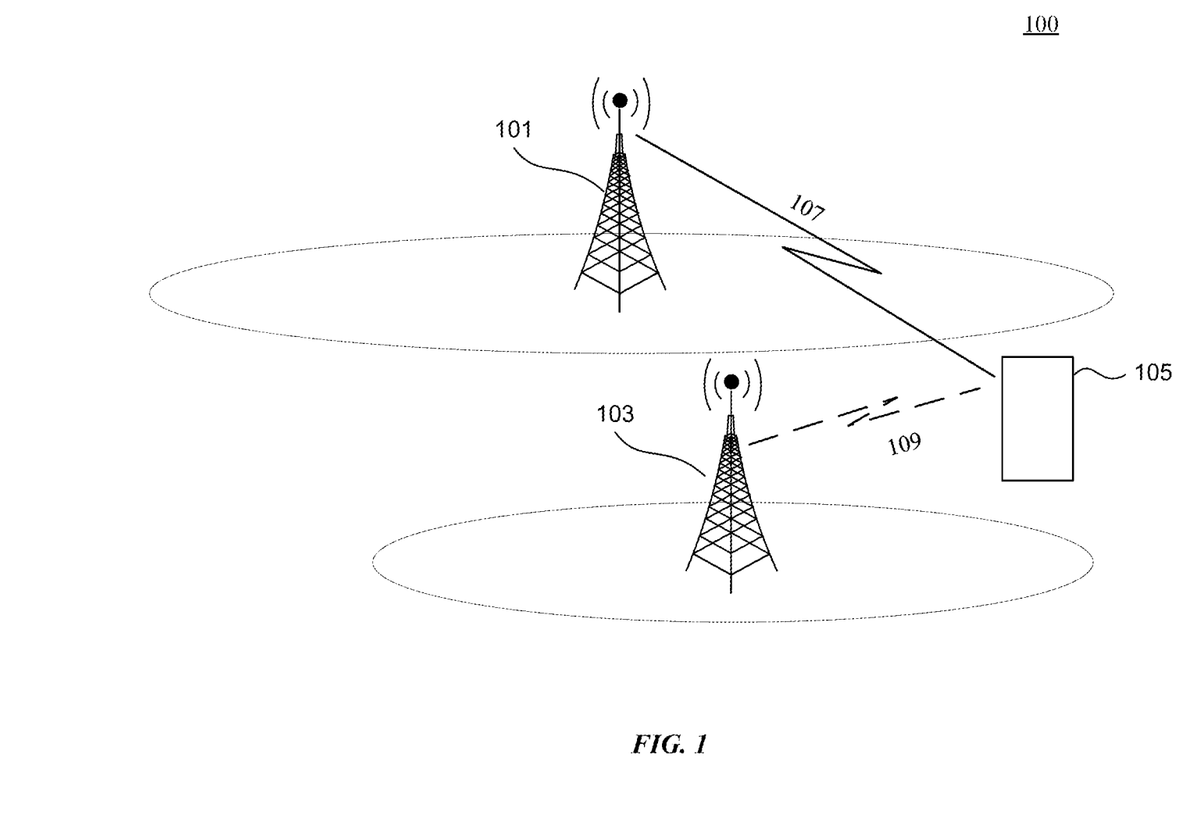
FIG. 1 illustrates an example system implementing mechanisms for simultaneous reception of SSB and other downlink signals, according to some aspects of the disclosure.

FIG. 1 illustrates an example system implementing mechanisms for simultaneous reception of SSB and other downlink signals, according to some aspects of the disclosure. Example system 100 is provided for the purpose of illustration only and does not limit the disclosed aspects. System 100 may include, but is not limited to, network nodes (for example, base stations such as eNBs, gNBs) 101 and 103 and electronic device (for example, a UE) 105. Electronic device 105 (hereinafter referred to as UE 105) can include an electronic device configured to operate based on a wide variety of wireless communication techniques. These techniques can include, but are not limited to, techniques based on 3rd Generation Partnership Project (3GPP) standards. For example, UE 105 can be configured to operate using the 3GPP standards. UE 105 can include, but is not limited to, as wireless communication devices, smart phones, laptops, desktops, tablets, personal assistants, monitors, televisions, wearable devices, Internet of Things (IoTs), vehicle's communication devices, and the like. Network node 101 (herein referred to as a base station) can include nodes configured to operate based on a wide variety of wireless communication techniques such as, but not limited to, techniques based on 3GPP standards.

According to some aspects, UE 105 and base stations 101 and 103 are configured for simultaneous reception of SSB and other downlink signals. In some aspects, UE 105 is configured for simultaneous reception of SSB and other downlink signals. According to some aspects, UE 105 can be connected to and can be communicating with base station 101 (e.g., the serving cell) using carrier 107 from which UE 105 receives the multiple downlink signals.

According to some aspects, UE 105 can measure one or more carriers (e.g., carrier 107) used for communication with base station 101 (e.g., the serving cell) to perform simultaneous reception of SSB and other downlink signals.

Figure 2:
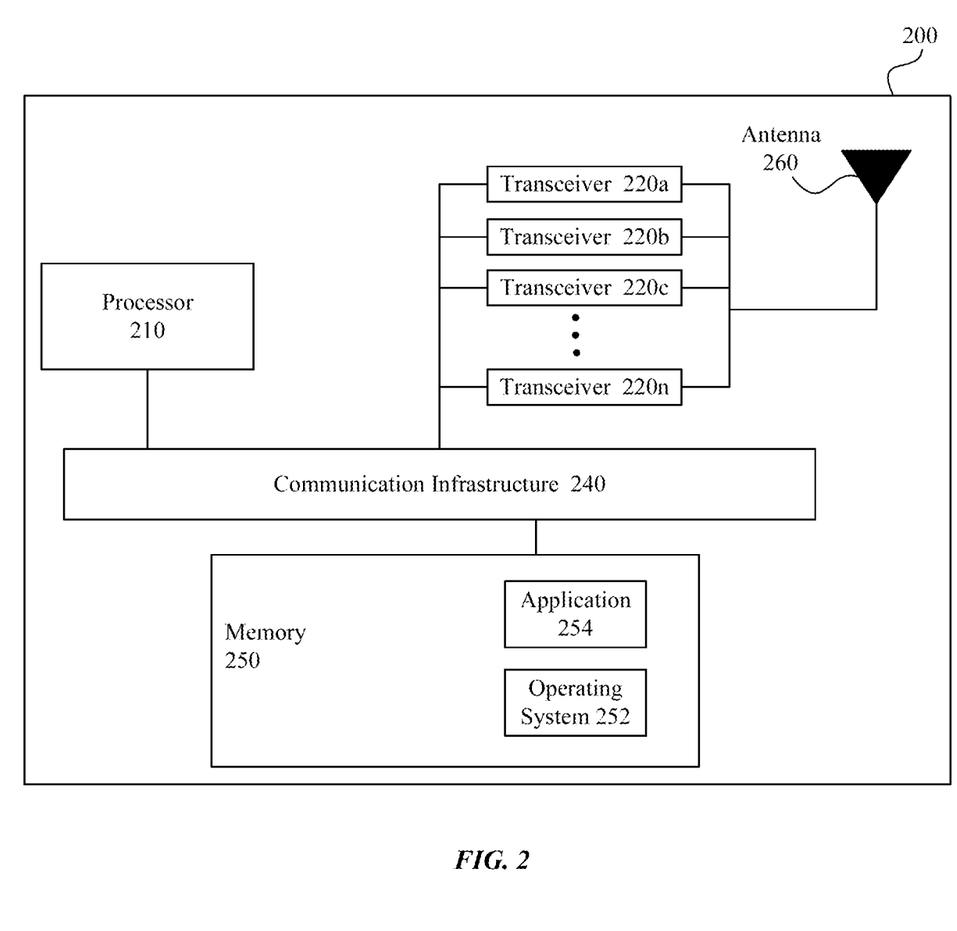
FIG. 2 illustrates a block diagram of an example system of an electronic device for simultaneous reception of SSB and other downlink signals, according to some aspects of the disclosure.

FIG. 2 illustrates a block diagram of an example system 200 of an electronic device implementing mechanisms for simultaneous reception of SSB and other downlink signals, according to some aspects of the disclosure. System 200 may be any of the electronic devices (e.g., base stations 101-103, UE 105) of system 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus.

Processor 210 together with instructions stored in memory 250 performs operations enabling system 200 of system 100 to implement mechanisms for simultaneous reception of SSB and other downlink signals, as described herein.

One or more transceivers 220*a*-220*n* transmit and receive communications signals that support mechanisms for performing time and/or frequency tracking based on those TRS configurations, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, buffers, and like circuits/devices used for connecting to and communication on networks. According to some examples, one or more transceivers 220*a*-220*n* include one or more circuits to connect to and communicate on wired and/or wireless networks.

According to some aspects, one or more transceivers 220*a*-220*n* can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220*a*-220*n* can include more or fewer systems for communicating with other devices.

In some examples, one or more transceivers 220*a*-220*n* can include one or more circuits (including a WLAN transceiver) to enable connection(s) and communication over WLAN networks such as, but not limited to, networks based on standards described in IEEE 802.11. Additionally, or alternatively, one or more transceivers 220*a*-220*n* can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, one or more transceivers 220*a*-220*n* can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, one or more transceivers 220*a*-220*n* can be configured to operate according to one or more of Rel-15, Rel-16, Rel-17, or other of the 3GPP standard.

According to some aspects, processor 210, alone or in combination with computer instructions stored within memory 250, and/or one or more transceiver 220*a*-220*n*, implements simultaneous reception of SSB and other downlink signals, as discussed herein. For example, transceiver 220*a* can enable connection(s) and communication over a first carrier (for example, carrier 107 of FIG. 1). In this example, transceiver 220*a* and/or transceiver 220*b* can enable reception of signaling of TRS configuration information (for example, carrier 109 of FIG. 1). Additionally, or alternatively, wireless system 200 can include one transceiver configured to operate at different carriers. Processor 210 can be configured to control the one transceiver to switch between different carriers, according to some examples. Although the operations discussed herein are discussed with respect to processor 210, it is noted that processor 210, alone or in combination with computer instructions stored within memory 250, and/or one or more transceiver 220*a*-220*n*, can implement these operations.

In the on-going development of wireless systems, there are on-going challenges to consider the impact of wireless communication protocol requirements with a view to continual improvement of the performance of the wireless system and of the user experience. Improvement considerations include improved power usage and power saving of user equipment (UE) devices so as to extend battery life, for example. In particular, the impact of enhancements to wireless communication systems for UEs when in an idle and/or inactive-mode are important considerations with respect to power saving and system performance aspects. As part of understanding the impact, paging enhancements to reduce unnecessary UE paging reception without an impact to legacy UEs are also relevant considerations.

Overview of Reception of SSB and Other Downlink Signals

In higher frequency bands, for example, the FR2 band (having frequencies in excess of 6 GHZ), analog beamforming is widely used to increase the link budget. The utilization of analog beamforming is done on both the basestation (e.g., gNB) side and the UE side. In an embodiment, the UE may use one analog beam to receive the downlink signals across component carriers (CCs) within a band or band group. The term "band group" indicates the bands that share the same antenna. In order for the UE to receive downlink signals simultaneously, the following four cases (Case 1, Case 2, Case 3 and Case 4) are defined.

In the first case, Case 1, the two downlink signals are the synchronization signal block (SSB) and physical downlink shared channel (PDSCH). In this case, the basestation (e.g., gNB) should ensure the same quasi co-location-Type D (QCL-TypeD), a spatial receiver parameter, for both the SSB and PDSCH signals is as defined in 3GPP Technical Specification TS 38.214, as follows. If the UE receives the demodulation reference signal (DM-RS) for PDSCH and an SS/PBCH block in the same orthogonal frequency division multiplexing (OFDM) symbol(s), then the UE may assume that the DM-RS and SS/PBCH block are quasi co-located with 'typeD', if 'typeD' is applicable. Note that this approach can be extended to cover the two signals, SSB and physical downlink control channel (PDCCH) in the same manner.

In the second case, Case 2, the two downlink signals are the SSB and the channel state information-reference signal (CSI-RS). In this case, the basestation (e.g., gNB) should ensure the same QCL-TypeD (Spatial Rx parameter) for both SSB and CSI-RS, as defined in 38.214 as follows. If the UE is configured with the CSI-RS resource in the same OFDM symbol(s) as an SS/PBCH block, the UE may assume that the CSI-RS and the synchronization signal/physical broadcast channel (SS/PBCH) block are quasi co-located with 'QCL-TypeD', if 'QCL-TypeD' is applicable.

In the third case, Case 3, the two signals are SSB for radio link monitoring (RLM), beam failure detection (BFD), candidate beam detection (CBD) and other signals. For these signals, the error case is as defined in 3GPP Technical Specification TS 38.133: The UE is not expected to transmit PUCCH/PUSCH/SRS or receive PDCCH/PDSCH/CSI-RS for tracking/CSI-RS for CQI on BFD-RS symbols to be measured for beam failure detection. The UE is not expected to transmit PUCCH/PUSCH or receive PDCCH/PDSCH on reference symbols to be measured for candidate beam detection.

In the fourth case, Case 4, the two signals are SSB and SSB. This case is undefined. Currently, Case 1 to case 4 only defines the case for signals from the same cell-signals associated with the same physical cell ID (PCI).

Architecture of Inter-Cell Mobility

In Release 17 and subsequent 3GPP Technical Specifications, both inter-cell multi-transmission/reception point (TRP) and Layer 1/Layer 2 (L1/L2)-centric inter-cell mobility are under consideration. In the scenario of inter-cell multi-TRP operation, a UE may communicate with both cells simultaneously and the UE needs to measure downlink signals from two or more cells to maintain the communication. In the other scenario of L1/L2-centric inter-cell mobility operation, a UE may need to communicate with only one cell at a time, but the UE still needs to measure downlink signals from two or more cells.

For both operations, the basestation (e.g., gNB) can configure the UE to measure the Layer 1 reference signal received power (L1-RSRP) based on SSBs in different cells. Note that the SSBs from different cells may be multiplexed in overlapped symbols or not.

Figure 3:
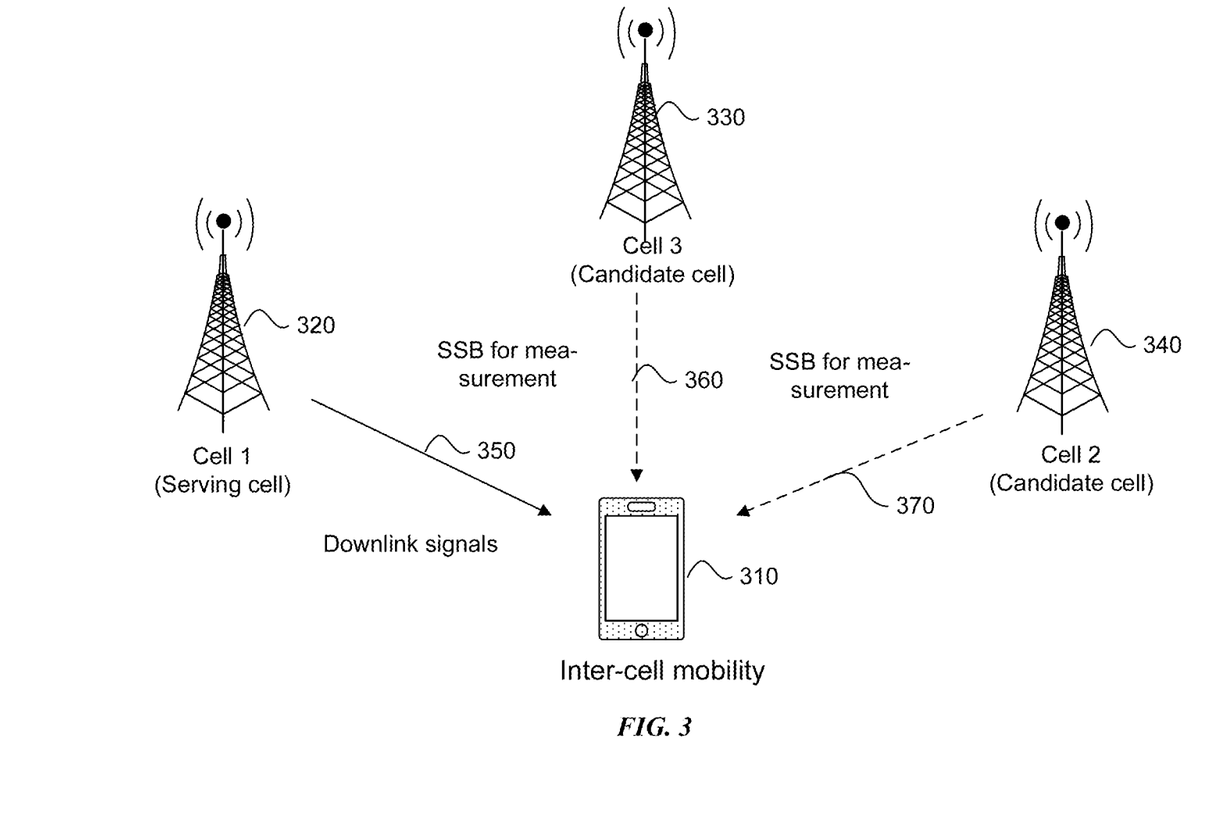
FIG. 3 illustrates a wireless architecture for an inter-cell mobility scenario, in accordance with various aspects of this disclosure.

FIG. 3 illustrates a wireless architecture for an inter-cell mobility scenario, in accordance with various aspects of this disclosure. In the vicinity of UE 310, there is Cell 1, which is a serving cell 320, Cell 2, which is a candidate cell 340, and Cell 3, which is a candidate cell 330. Serving cell 320 transmits downlink signals 350 for receipt by UE 310. Candidate cell 340) transmits downlink signals 370) for possible receipt by UE 310. Candidate cell 330 also transmits downlink signals 360 for possible receipt by UE 310.

Figure 4:
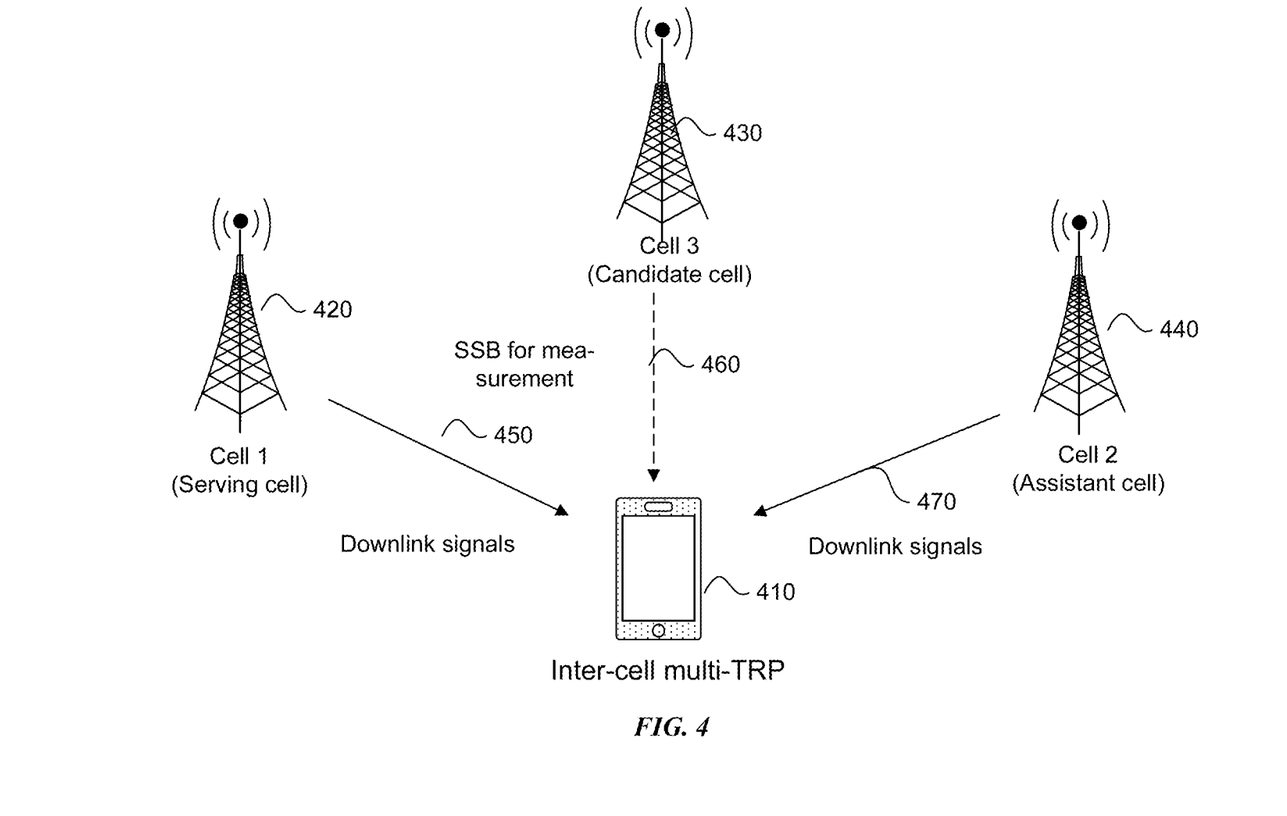
FIG. 4 illustrates a wireless architecture for an inter-cell multi-transmission/reception point (TRP) mobility scenario, in accordance with various aspects of this disclosure.

FIG. 4 illustrates a wireless architecture for an inter-cell multi-transmission/reception point (TRP) mobility scenario, in accordance with various aspects of this disclosure. In the vicinity of UE 410, there is Cell 1, which is a serving cell 420, Cell 2, which is an assistant cell 440, and Cell 3, which is a candidate cell 430. Serving cell 420 transmits downlink signals 450 for receipt by UE 410. Assistant cell 440 transmits downlink signals 470 for receipt by UE 410. Candidate cell 430 also transmits downlink signals 460 for possible receipt by UE 410. In this disclosure, the term "assistant cell" is used to describe a cell that transmits or receives only dedicated signals to or from the UE. An "assistant cell" is therefore different from a "serving cell" in that a "serving cell" sends all common and dedicated signals to the UE. A "candidate cell" sends some measurement-related signals to the UE only.

The challenge of the three different cell types is that the four above Cases, Case 1 through Case 4, need to be enhanced to accommodate each situation as, in each case, there are different channels/signals from the different cells simultaneously impinging on the UE. In particular, the UE may or may not be able to simultaneously receive signals based on different QCL-TypeD concerns. In order to resolve this challenge, each of the following scenarios needs to be considered: (a) Scenario 1, where the SSB signal is from the serving cell (e.g., serving cell 420), while the second signal is from an assistant cell (e.g., assistant cell 440); (b) Scenario 2, where the SSB signal is from the serving cell (e.g., serving cell 420), but the second signal is from a candidate cell (e.g., candidate cell 430); (c) Scenario 3, where the SSB signal is from an assistant cell (e.g., assistant cell 440), and the second signal is from the serving cell (e.g., serving cell 420); (d) Scenario 4, where the SSB is from an assistant cell (e.g., assistant cell 440), and the second signal is from an assistant cell (e.g., assistant cell 440); (e) Scenario 5, where the SSB signal is from a candidate cell (e.g., candidate cell 440), and the second signal is from the serving cell (e.g., serving cell 420); and (f) Scenario 6, where the SSB signal is from a candidate cell (e.g., candidate cell 430), while the second signal is from an assistant cell (e.g., assistant cell 440).

Cases 1 and 2

Turning to Cases 1 and 2, it is noted that Scenario 2 is not considered for these two cases. For a UE that can support only one QCL-TypeD at a time, the basestation (e.g., gNB) should ensure the same QCL-TypeD for SSB and PDSCH/CSI-RS/PDCCH are associated with the same PCI, as for example, in Scenario 4. When the SSB signal and the PDSCH/CSI-RS/PDCCH signal are associated with a different PCI, as for example in Scenarios 1, 3, 5 and 6, there are two possible options. In the first option, Option 1, it is considered to be an error case, and a scheduling restriction should be introduced to preclude this type of scenario. In the second option, Option 2, a priority rule may be introduced, for example, such that the UE may drop one of the two signals, either the SSB signal or PDSCH/CSI-RS/PDCCH signal. The priority decision may be determined by the cell type associated with these signals. For example, the serving cell may have a higher priority that an assistance cell, which in turn may have a higher priority than a candidate cell.

It is noted in the above that either Option 1 or Option 2 may be applied to each of the different scenarios, where a different option for one scenario may be chosen for one scenario independently of the choice made for any of the other scenarios.

For a UE that can support two QCL-TypeD at a time (e.g., simultaneously), the basestation (e.g., gNB) should ensure that the same QCL-TypeD is used for SSB signals and PDSCH/CSI-RS/PDCCH signals that are associated with the same PCI, for example, Scenario 4. For Scenarios 1 and 3, the UE can receive both the SSB signals and the PDSCH/CSI-RS/PDCCH signals that are associated with the different PCI. For Scenarios 5 and 6, options 1 and 2 above may be used in the same manner, as described above.

For the following discussion, it is assumed that the UE can report its capability on whether it can support two different QCL-TypeD at a time (e.g., simultaneously). In such a situation, the associated cell for the PDSCH/CSI-RS signals can be determined by its quasi-co-location (QCLed) configuration. Here, it is assumed that the PDSCH/CSI-RS/PDCCH signals are associated with cell "X" if it is configured to be directly or indirectly QCLed with the SSB signal from cell "X". Conversely, if the PDSCH/CSI-RS/PDCCH signals are not QCLed with any SSB signal, it is assumed to be QCLed with the serving cell or the cell with the scheduling PDCCH.

Case 3

Turning to Case 3, it is again noted that Scenario 2 is not considered for this case.

For a UE that can support only one QCL-TypeD at a time, the UE is not expected to transmit the physical uplink control channel (PUCCH)/physical uplink shared channel (PUSCH)/sounding reference signal (SRS) signals or receive the physical downlink control channel (PDCCH)/physical downlink shared channel (PDSCH)/channel state information-reference signal (CSI-RS) signals for tracking/CSI-RS signals for channel quality information (CQI) on the symbols with SSB for beam failure detection (BFD)/radio link monitoring (RLM)/candidate beam detection (CBD) signal.

For a UE that can support two QCL-TypeD at a time (e.g., simultaneously), the UE is not expected to transmit the PUCCH/PUSCH/SRS signal or receive the PDCCH/PDSCH/CSI-RS signal for tracking/CSI-RS for CQI on the symbols with SSB for BFD/RLM/CBD with the same PCI, for example, Scenario 4. For Scenarios 1 and 3, the UE can receive both SSB for BFD/RLM/CBD and PDSCH/CSI-RS that are associated with the different physical cell ID (PCI) values.

For Scenarios 5 and 6 (SSB for CBD only), the following options are provided in terms of reception of downlink signals. For Option 1, it is considered to be an error case. For Option 2, the UE can receive both signals. For Option 3, the UE can report whether it can receive both signals or not, using one of three alternatives: UE capability, or medium access control (MAC) control element (CE), or uplink control information (UCI). When reported by MAC CE or UCI, the UE can indicate the cells that be received simultaneously. For example, if the UE uses different panels to receive different cells, the cells can be received simultaneously; otherwise, the UE can receive only signals from one cell.

Case 4—UE Supports One QCL-TypeD at a Time

Turning to Case 4, it is noted that only Scenarios 1, 2, 3, 5 and 6 are considered for Case 4. For a UE that can support only one QCL-TypeD at a time, the following options are provided. For the first option, Option 1, this is considered as an error case. Alternatively, a UE capability can be introduced to indicate whether it supports the overlapped SSBs. In the second option, Option 2, a priority rule is introduced, where the rule takes into account the functionality of the SSB and/or cell type to evaluate the priority. In some exemplary embodiments, the serving cell may have a higher priority than an assistance cell, which in turn may have a higher priority than a candidate cell. In other exemplary embodiments, the priority is defined so that an SSB for BFD signal has a priority greater than an SSB for RLM signal, which in turn has a greater priority than an SSB for CBD signal, and in turn a greater priority than an SSB for BM signal, and in turn a greater priority than an SSB signal without any functionality configured.

In the third option, Option 3, the choice of which SSB signal to be received can be configured by higher layer signaling, such as RRC or MAC CE. Here, the basestation, (e.g., gNB) can configure a measurement window/gap for a cell or for SSB(s) in a cell. The measurement window may provide different indications. In one indication, the measurement window indicates when the UE should measure the SSB signal(s). In another indication, the measurement gap indicates when UE should not measure the SSB signal(s). For each measurement window/gap, gNB may provide some or all the following information: Periodicity and offset, Cell index and/or SSB index(es).

In the fourth option, Option 4, the UE reports the measurement behavior for the cells to gNB by UE capability or MAC CE or UCI, with similar parameters to those described in Option 3.

Figure 5:
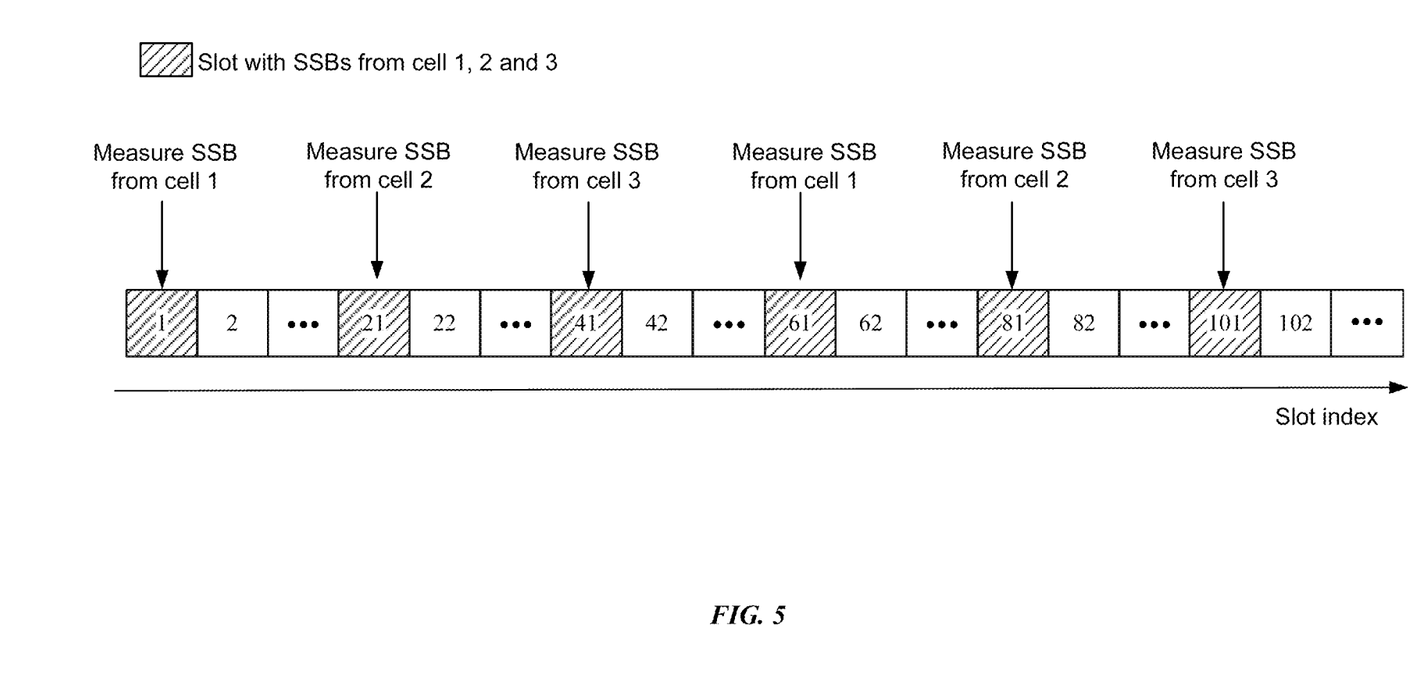
FIG. 5 illustrates the measurement window configuration for three cells, cell 1, cell 2 and cell 3, in accordance with some aspects of the disclosure.

Referring to Option 3, FIG. 5 illustrates the measurement window configuration for three cells, cell 1, cell 2 and cell 3, in accordance with some aspects of the disclosure. In FIG. 5, the measurement window for cells 1, 2 and 3 are configured with a periodicity of 60 slots, with respective offsets of 1, 21, and 41 slots for cells 1, 2 and 3.

Case 4—UE Supports Two QCL-TypeD at a Time

For an UE that can support two QCL-TypeD at a time, the UE can receive signals from both the serving cell and assistant cells simultaneously. In the first option, Option 1, it is considered an error case to multiplex SSBs from the serving/assistant cell and the candidate cell in overlapped symbols. Alternatively, a UE capability can be introduced to indicate whether it support this case or not. In a second option, Option 2, a priority rule is introduced, which considers the functionality of the SSB and/or cell type In some exemplary embodiments, the serving cell or assistant cell may have a higher priority that a candidate cell. In other exemplary embodiments, the priority is defined as an SSB for BFD signal has a priority greater than an SSB for RLM signal, which in turn has a greater priority than an SSB for CBD signal, and in turn a greater priority than an SSB for BM signal, and in turn a greater priority than an SSB signal without any functionality configured.

In a third option, Option 3, the timing of when to measure the candidate cell's SSB to be received can be configured by higher layer signaling, e.g., radio resource control (RRC) or MAC CE. The basestation (e.g., gNB) can configure a measurement window for a candidate cell or for SSB(s) in a candidate cell. The measurement window may provide different indications. In one indication, the measurement window indicates when the UE should measure the SSB signal(s). In another indication, the measurement gap indicates when UE should not measure the SSB signal(s) in other cells. As an extension in this latter indication, the UE does not receive any signals from other cells. For each measurement window/gap, gNB may provide some or all the following information: Periodicity and offset, Cell index and/or SSB index(es).

In the fourth option, Option 4, the UE reports the measurement behavior for the candidate cell to the base station (e.g., gNB) by UE capability or MAC CE or UCI, with similar parameters to those described in Option 3.

Figure 6:
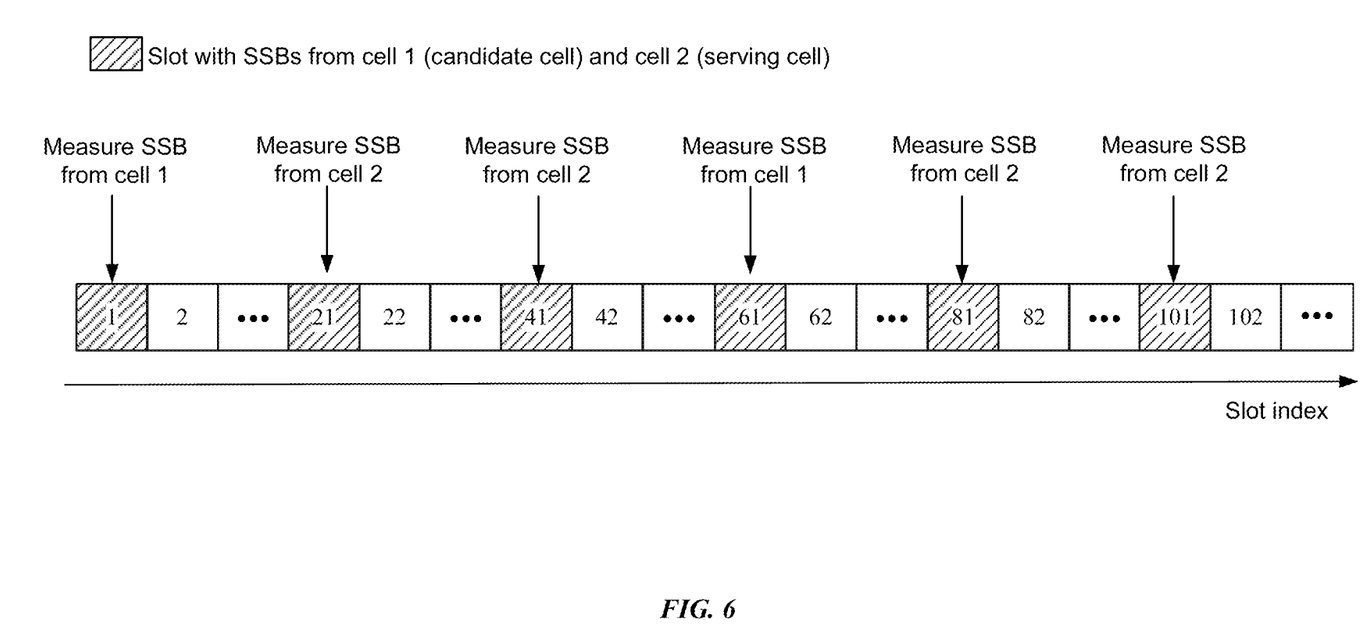
FIG. 6 illustrates the measurement window configuration for two cells, cell 1 (candidate cell) and cell 2 (serving cell), in accordance with aspects of this disclosure.

Referring to Option 3, FIG. 6 illustrates the measurement window configuration for two cells, cell 1 (candidate cell) and cell 2 (serving cell), in accordance with aspects of this disclosure. In FIG. 6, the measurement window for cells 1 and 2 are configured with a periodicity of 60 slots, with an offset of 1 slot.

Based on the above discussion, a general procedure to determine the signal for simultaneous reception is as follows. In the first step, Step 1 (an optional step), the UE reports whether it can support one or two QCL-TypeD at a time, and whether it supports SSBs in different cells multiplexed in overlapped symbols. In the second step, Step 2 (see Case 4 above for more details), the UE determines the SSB to receive when there are multiple SSBs from different cells in a slot. In the third step, Step 3 (see Case 3 above for more details), the UE determines whether there are other signals in the same symbols with the selected SSB based on the type of signal and SSB's functionality. In the fourth step, Step 4 (see Cases 1 and 2 above for more details), if there are another downlink signals (CSI-RS or PDSCH) from another cell, the UE selects the corresponding QCL assumption to receive the signals.

Figure 7:
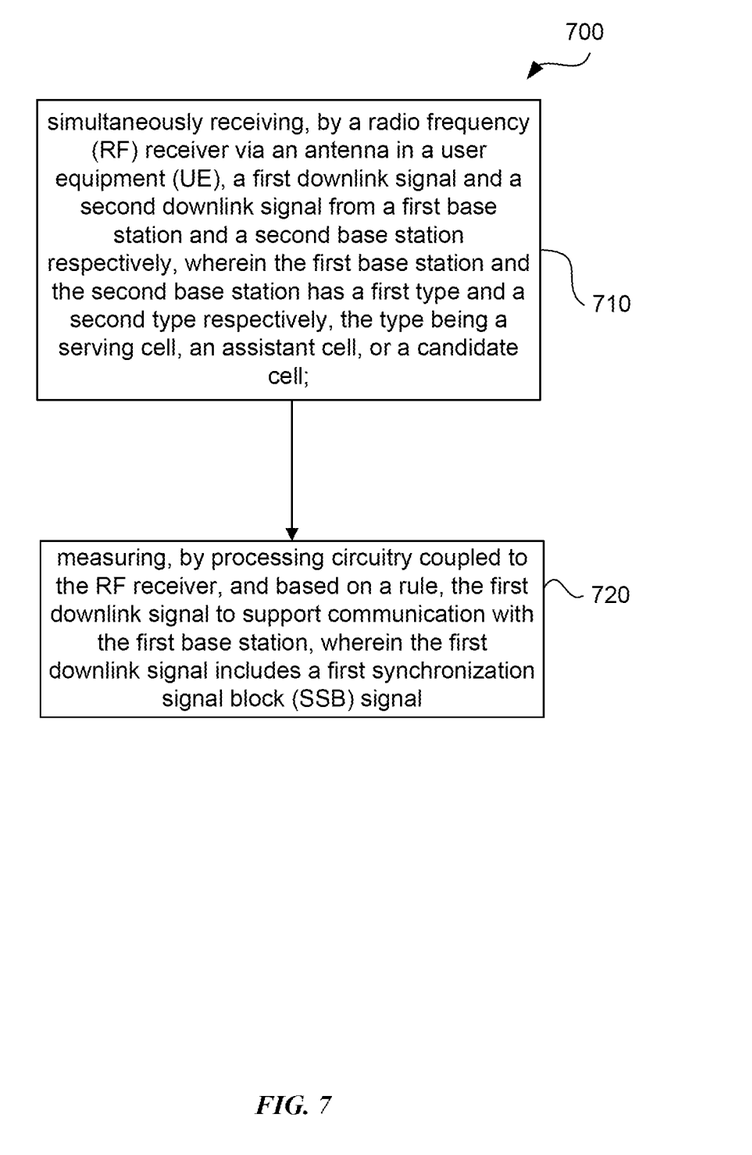
FIG. 7 illustrates a flowchart diagram of a method 700 for simultaneous reception of SSB and other downlink signals, in accordance with aspects of the present disclosure.

FIG. 7 illustrates a flowchart diagram of a method 700 for simultaneous reception of SSB and other downlink signals, in accordance with aspects of the present disclosure. Step 710 includes simultaneously receiving, by a radio frequency (RF) receiver via an antenna in a user equipment (UE), a first downlink signal and a second downlink signal from a first base station and a second base station respectively, wherein the first base station and the second base station has a first type and a second type respectively, the type being a serving cell, an assistant cell, or a candidate cell.

Step 720 includes measuring, by processing circuitry coupled to the RF receiver, and based on a rule, the first downlink signal to support communication with the first base station, wherein the first downlink signal includes a first synchronization signal block (SSB) signal.

Figure 8:
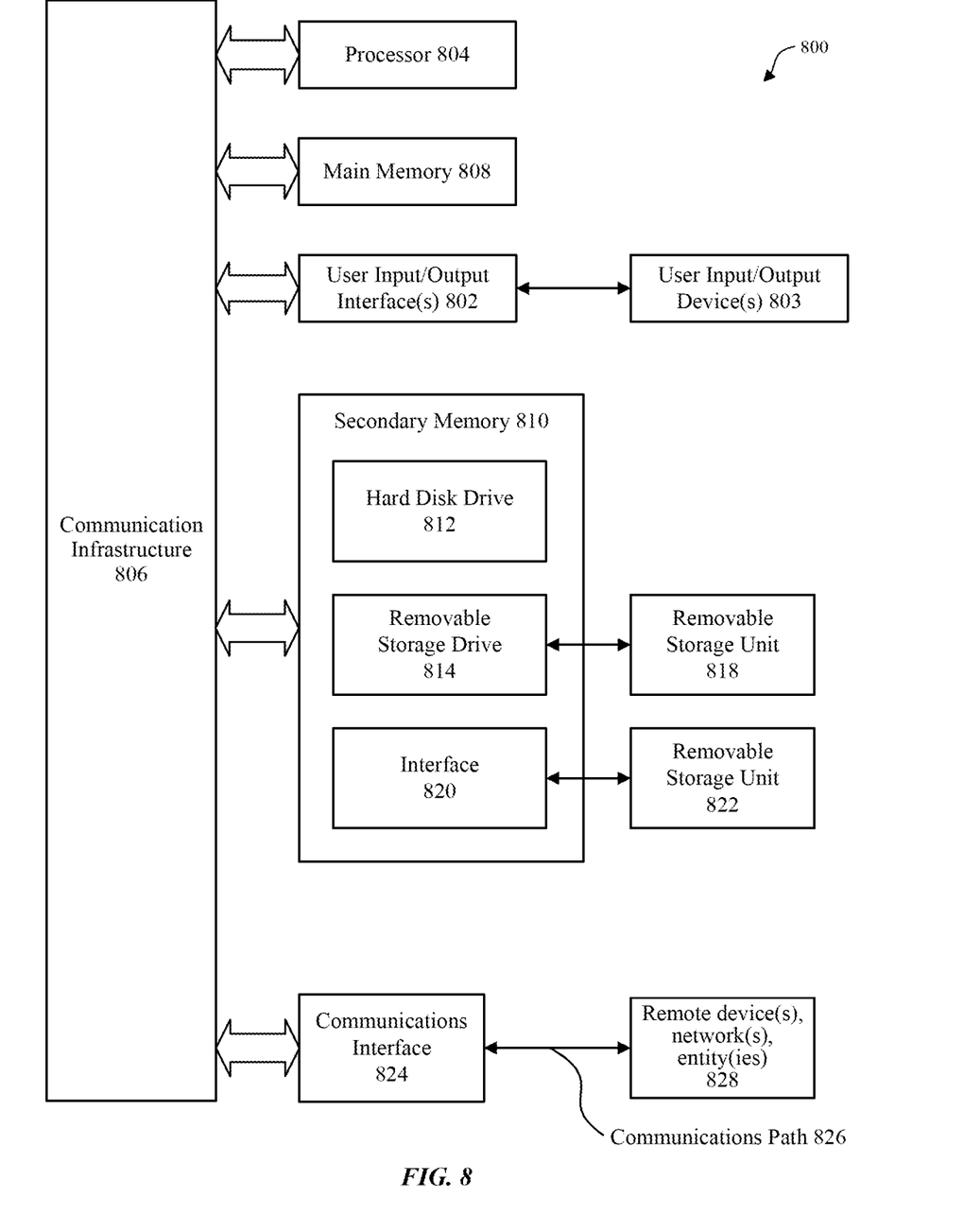
FIG. 8 is an example computer system for implementing some aspects or portion(s) thereof.

Various aspects can be implemented, for example, using one or more computer systems, such as computer system 900 shown in FIG. 9. Computer system 900 can be any well-known computer capable of performing the functions described herein such as devices 101, 103, 105 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and may include any combination of LANs, WANs, the Internet, etc. Control logic and/or data may be transmitted to and from computer system 800 via communication path 826.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "an example aspect," or similar phrases, indicate that the aspect described may include a particular feature, structure, or characteristic, but every aspects may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

What is claimed is:

1. A user equipment (UE) comprising:
a radio frequency (RF) receiver configured to simultaneously receive, via an antenna, a first downlink signal and a second downlink signal from a first base station and a second base station respectively, wherein the first base station and the second base station have a first type and a second type respectively, the first type and the second type being a serving cell, an assistant cell, or a candidate cell; and
processing circuitry coupled to the RF receiver, the processing circuitry configured to:
measure, based on a rule, the first downlink signal to support communication with the first base station, wherein the first downlink signal includes a first synchronization signal block (SSB) signal; and
measure the second downlink signal, wherein the second downlink signal includes a second SSB signal, and wherein the rule is a priority rule that a priority of an SSB for beam failure detection (BFD) is higher than an SSB for radio link monitoring (RLM), which in turn is higher than an SSB for candidate beam detection (CBD), which in turn is higher than an SSB for beam management (BM), and which in turn is higher than an SSB without any configured functionality.

2. The UE of claim 1, wherein the first type being the serving cell or the assistant cell, the second type being the candidate cell, and wherein the rule includes a further priority rule that a priority of the serving cell or the assistant cell exceeds a priority of the candidate cell.

3. The UE of claim 2, wherein measuring the second SSB signal includes measuring the second SSB signal based on a measurement window information provided by higher layer signaling.

4. The UE of claim 3, wherein the measurement window information includes at least one of a periodicity, an offset, a cell index, or an SSB index.

5. The UE of claim 1, wherein the first SSB signal is an SSB signal for the BFD, an SSB signal for the RLM, or an SSB signal for the CBD, and the second downlink signal further includes a physical downlink shared channel (PDSCH) signal or a channel state information-reference signal (CSI-RS) signal, and the first type is the serving cell and the second type is the assistant cell, or the first type is the assistant cell and the second type is the serving cell.

6. The UE of claim 1, wherein the first SSB signal is an SSB signal for the CBD.

7. The UE of claim 1, wherein the UE further includes a transmitter coupled to the processing circuitry, the UE configured to report a measurement capability to measure the first downlink signal and the second downlink signal, the UE using different panels in the antenna to receive the first downlink signal and the second downlink signal.

8. The UE of claim 1, wherein the second downlink signal further includes a physical downlink shared channel (PDSCH) signal or a channel state information-reference signal (CSI-RS) signal or a physical downlink control channel (PDCCH) signal, and the first type is the serving cell and the second type is the assistant cell, or the first type is the assistant cell and the second type is the serving cell.

9. The UE of claim 1, wherein the UE further includes a transmitter coupled to the processing circuitry, the UE configured to report quasi co-location Type D (QCL-TypeD) support, the support indicating whether the UE can support one or two QCL-TypeD configurations at a time.

10. A method comprising:
simultaneously receiving, by a user equipment (UE), a first downlink signal and a second downlink signal from a first base station and a second base station respectively, wherein the first base station and the second base station have a first type and a second type respectively, the first type and the second type being a serving cell, an assistant cell, or a candidate cell;
measuring, based on a rule, the first downlink signal to support communication with the first base station, wherein the first downlink signal includes a first synchronization signal block (SSB) signal; and
measuring the second downlink signal, wherein the second downlink signal includes a second SSB signal, and wherein the rule is a priority rule that a priority of an SSB for beam failure detection (BFD) is higher than an SSB for radio link monitoring (RLM), which in turn is higher than an SSB for candidate beam detection (CBD), which in turn is higher than an SSB for beam management (BM), and which in turn is higher than an SSB without any configured functionality.

11. The method of claim 10, wherein the first type being the serving cell or the assistant cell, the second type being the candidate cell, and wherein the rule includes a further priority rule that a priority of the serving cell or the assistant cell exceeds a priority of the candidate cell.

12. The method of claim 11, wherein measuring the second SSB signal includes measuring the second SSB signal based on a measurement window information provided by higher layer signaling.

13. The method of claim 10, wherein the first SSB signal is an SSB signal for the BFD, an SSB signal for the RLM, or an SSB signal for the CBD, and the second downlink signal further includes a physical downlink shared channel (PDSCH) signal or a channel state information-reference signal (CSI-RS) signal, and the first type is the serving cell and the second type is the assistant cell, or the first type is the assistant cell and the second type is the serving cell.

14. The method of claim 10, wherein the first SSB signal is an SSB signal for the CBD.

15. The method of claim 10, further comprising reporting a measurement capability to measure the first downlink signal and the second downlink signal, the UE using different panels in an antenna to receive the first downlink signal and the second downlink signal.

16. The method of claim 10, wherein the second downlink signal further includes a physical downlink shared channel (PDSCH) signal or a channel state information-reference signal (CSI-RS) signal or a physical downlink control channel (PDCCH) signal, and the first type is the serving cell and the second type is the assistant cell, or the first type is the assistant cell and the second type is the serving cell.

17. The method of claim 10, further comprising reporting quasi co-location Type D (QCL-TypeD) support, the support indicating whether the UE can support one or two QCL-TypeD configurations at a time.

* * * * *